June 29, 1926. 1,590,676
E. J. DONCASTER
REVERSIBLE CLUTCH MECHANISM
Filed Oct. 18, 1924 3 Sheets-Sheet 2
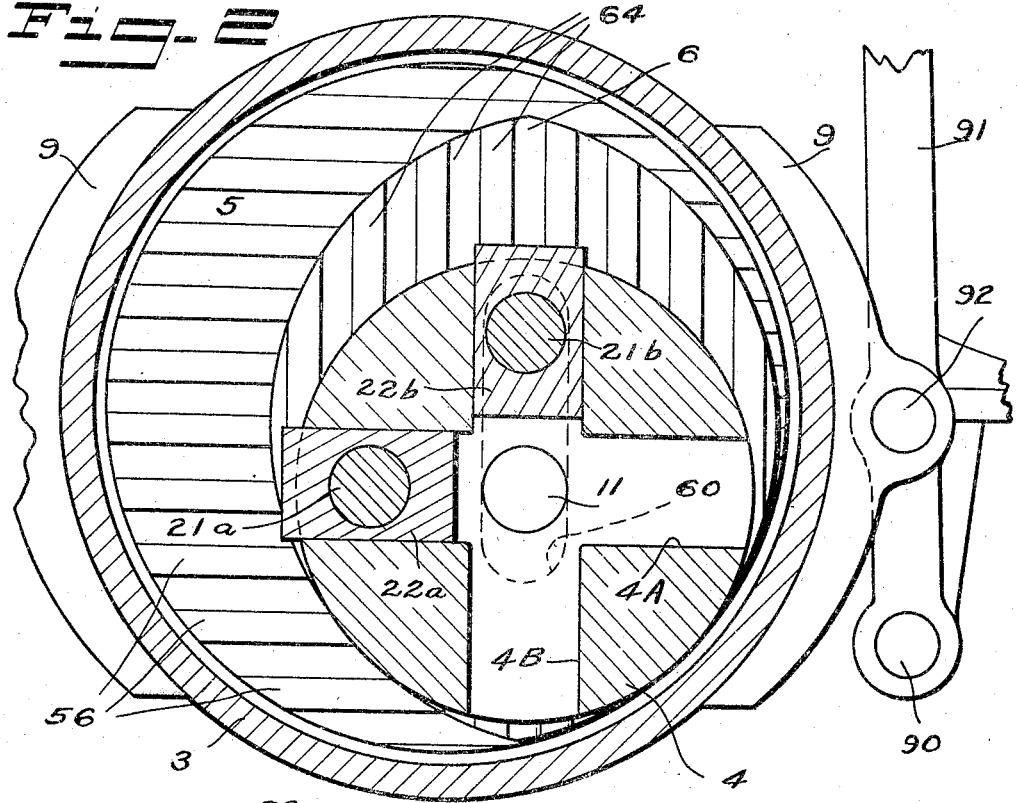
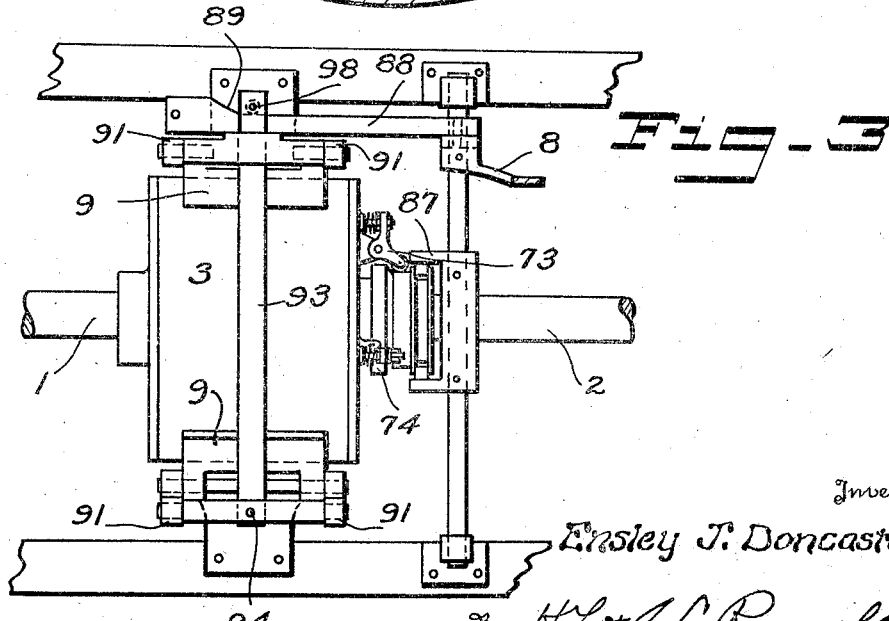
Inventor
Ensley J. Doncaster
By H. L. & C. L. Reynolds
Attorneys

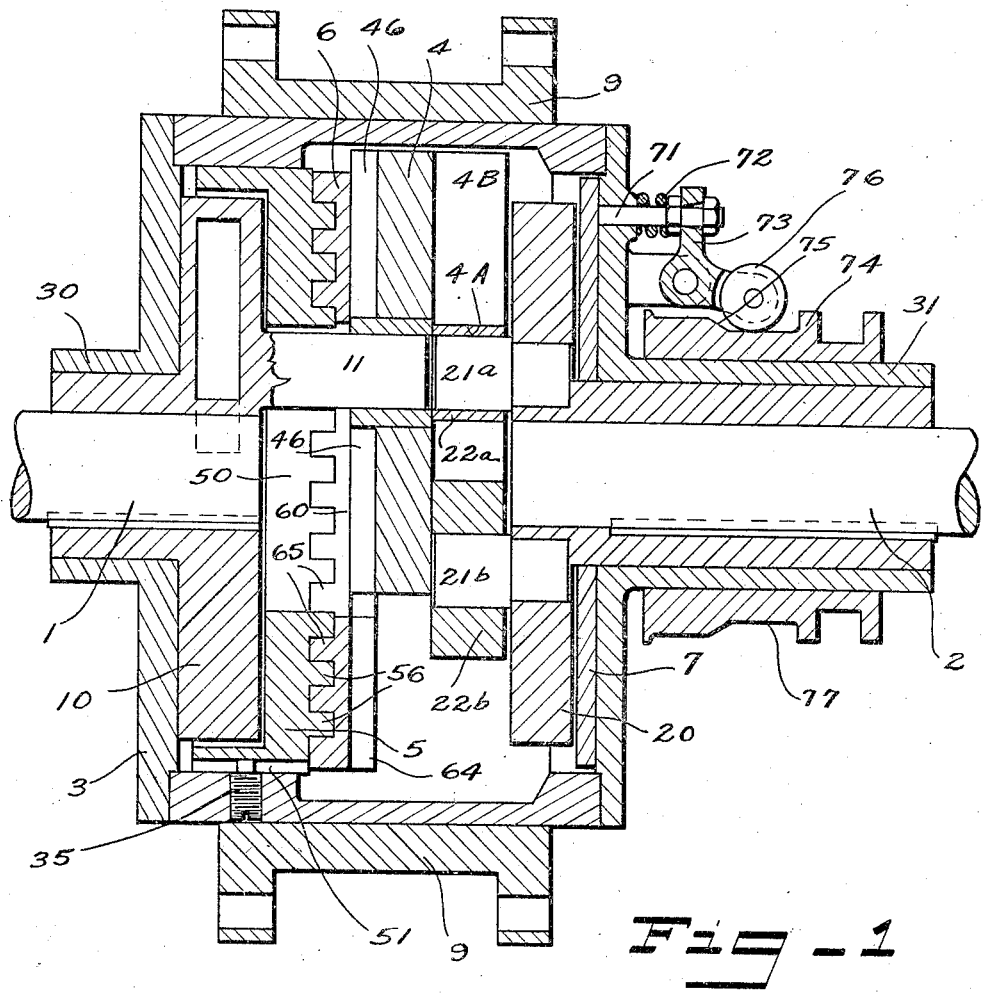

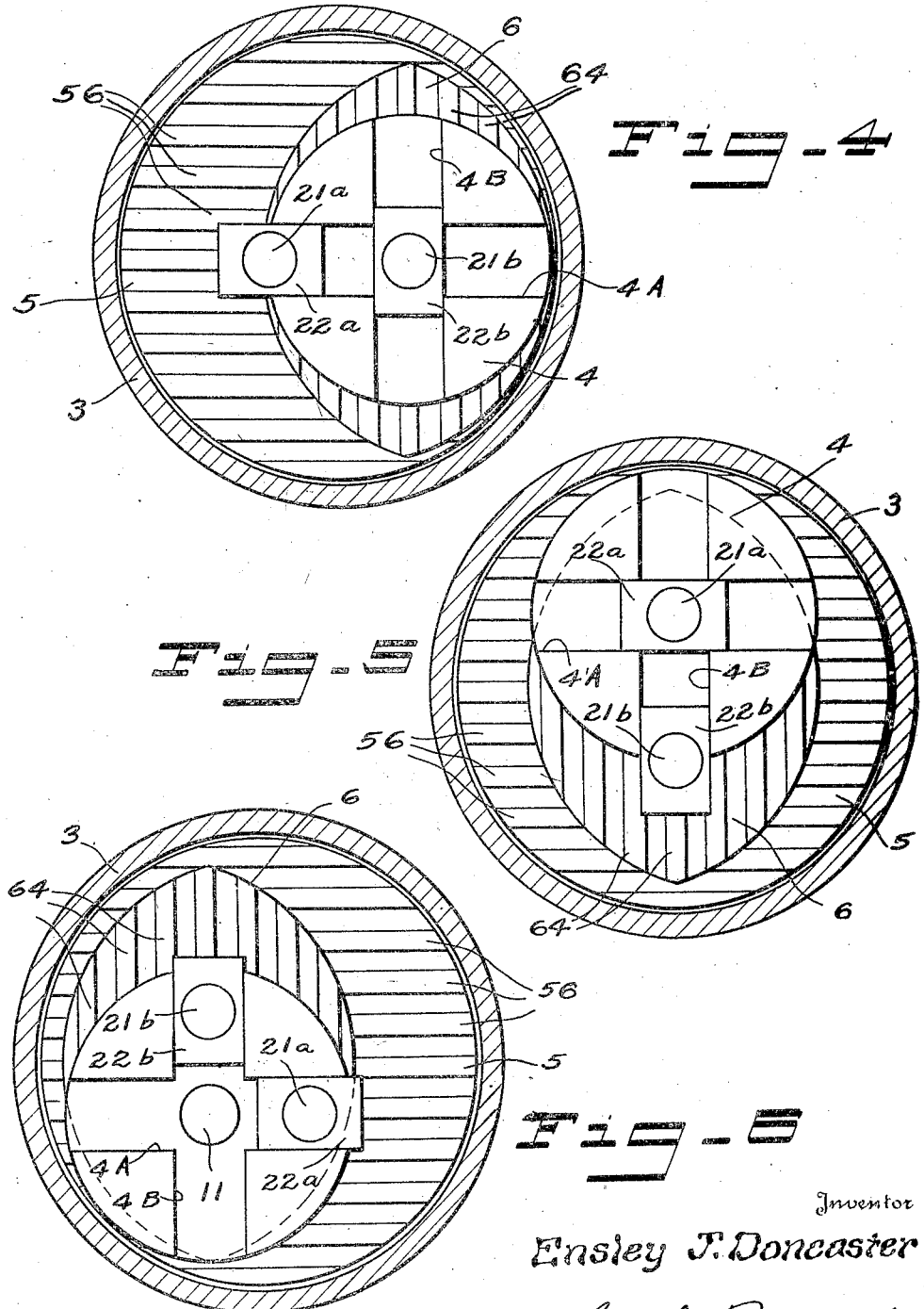

Patented June 29, 1926.

1,590,676

UNITED STATES PATENT OFFICE.

ENSLEY J. DONCASTER, OF RAYMOND, WASHINGTON, ASSIGNOR TO AMERICAN MANUFACTURING & SALES CO., OF RAYMOND, WASHINGTON, A CORPORATION OF WASHINGTON.

REVERSIBLE CLUTCH MECHANISM.

Application filed October 18, 1924. Serial No. 744,397.

My invention relates to an improvement in clutches and particularly to devices of the sort which are intended for use in marine work or in similar installations where it is only necessary to provide for operation in a forward and in a reverse direction and for idling.

The objects of my invention are to provide a device of this sort which will be simple and effective in operation, which can be readily controlled, in which all parts can be properly and conveniently kept lubricated, and which can be manufactured with a minimum of complicated and expensive machine work.

My invention comprises the novel parts and combinations thereof which are shown in the accompanying drawings, described in the specification, and particularly defined by the claims terminating the same.

In the accompanying drawings I have shown my invention in the form which is now preferred by me.

Figure 1 is an axial section through the device.

Figure 2 is a section substantially on the line 2—2 of Figure 1.

Figure 3 is a plan view of the device, parts being broken away for clearness.

Figures 4, 5 and 6 are sections similar to Figure 2, and on the same line therewith, but illustrating successive stages in the reverse operation of the clutch.

Essentially my device is embodied in a means for connecting two alined shafts, a driving shaft as 1 and a driven shaft as 2, in such manner that the two shafts may at will be clutched together for operation at the same speed and in the same direction, for operation at like speeds but in reverse directions, or by means of which the driving shaft may be permitted to turn but is disconnected from the driven shaft 2, the motion being taken up in the clutch mechanism.

A casing 3 is supported upon the adjacent ends of the two shafts 1 and 2. For this purpose the casing may be provided with sleeves 30 and 31 which are supported upon the respective shafts 1 and 2 or upon members mounted thereon. The clutch mechanism proper is contained within this casing 3. Secured upon the driving shaft 1 and revoluble thereabout is a single crank pin 11. Preferably this is secured to or formed as part of a crank disk 10, which crank disk is keyed upon the driving shaft 1. The use of a disk however, is not essential, it being only necessary to support the crank pin 11 upon the driving shaft 1 a short distance outward from its axis. Upon the driven shaft 2 I provide a pair of crank pins $21^a$ and $21^b$. These likewise may be supported upon a second crank disk 20, for convenience, and are shown as diametrically opposite thereon.

Means are included within the casing 3 which are operatively connected to the pair of crank pins $21^a$ and $21^b$ to revolve the latter about the axis of the driven shaft 2 or to be rotated thereby in case this pair of crank pins is maintained stationary, as, for example, by the external resistance transmitted thereto through a propeller upon the shaft 2. Such means is shown as comprising a disk 4 provided in one face with two grooves $4^A$ and $4^B$, crossing at an angle, preferably at right angles. The groove $4^A$ receives the crank pin $21^a$ or a slide $22^a$ secured thereto, and the groove $4^B$ receives the pin $21^b$ or a similar slide $22^b$ secured thereto. Each such slide moves across the disk 4 in its respective groove. The manner in which these cross will be hereinafter more fully explained. The disk 4 is engaged by the single crank pin 11 at its center for revolution about the axis of the shafts 1 and 2, but is held by means to be described against rotation relative to the casing 3.

For thus holding the disk 4 I provide a disk 5 positioned adjacent the crank disk 10 which is held in the casing 3 in such manner as to move to a limited extent axially thereof, but to be non-rotative relative to the casing. This may be secured by pins 35 secured in the casing 3, and fitting corresponding grooves 51 in the edge of the disk 5. The disk 5 for convenience is termed the casing disk, being practically part of the casing, and its central portion is cut away, as indicated at 50, to an extent sufficient to permit rotation of the crank pin 11. Between the casing disk 5 and the disk 4 I provide means such as the floating disk 6, which coacts between these two disks to hold the disk 4 non-rotative relative to the casing. The floating disk 6 is provided with a series of parallel grooves 65 in one face, into which fit tongues 56 upon the casing disk 5. Upon its opposite face the disk 6 is provided with a second series of parallel grooves 64, running at an angle to the grooves 65, and preferably at right angles thereto, which receive corresponding tongues 46 upon the adjacent face of the disk 4. The central portion of the floating disk 6 is cut away, or at least a slot 60 is cut therein, to permit passage through the disk of the crank pin 11.

It will now be clear that the floating disk 6 may slide transversely of the casing 3 upon the tongues 56, and that the disk 4 may slide in a direction at right angles in the grooves 64 of the disk 6. By a combination of these movements, therefore, the disk 4 may slide both transversely and vertically as seen in Figures 4–6, and in any combination of these two directions, thus to achieve a movement of revolution about the axis of the shafts 1 and 2 and through a diameter determined by the diameter of the path of the crank pin 11, but in all of this movement the disk 4 is held against rotation relative to the casing 3, it being impossible for the disk to rotate relative to the floating disk 6 and it being impossible for the floating disk to rotate relative to the casing disk 5, the latter being held by the pins 35 against rotation relative to the casing.

By reason of this movement of revolution of the disk 4 relative to the casing 3, pressure is created upon one side of each of the slides 22$^a$ and 22$^b$. If the casing 3 is held against rotation the tendency will be for the pair of diametrically opposed crank pins 21$^a$ and 21$^b$ to be forced in a direction the reverse of the direction of rotation of the driving shaft 1. Thus assuming that the crank pin 11 in Figure 1 is moving toward the observer, which would be in a counter-clockwise direction as seen in Figures 4, 5 and 6, this would tend to move the disk 4 likewise in a counter-clockwise direction, this disk and the crank pin 11 being directly connected. This, in Figure 4 will cause the slide 22$^b$ to move downward and to the left under pressure from the right, and the slide 22$^a$ to move to the right and upward under pressure from below. This, after a quarter revolution of the disk 4, brings parts to the position shown in Figure 5 where the slide 22$^b$ is at the extreme lower end of its slot 4$^B$, and where the slide 22$^a$ is at the central portion of its slot 4$^A$ and is crossing the slot 4$^B$. Continued counterclockwise movement of the disk 4 moves the slide 22$^a$ to the right and downward and moves the slide 22$^b$ to the left and upward until, when the disk 4 is in the position shown in Figure 6, the slide 22$^a$ has reached the extreme right limit of its movement and has started back, and the slide 22$^b$ has crossed the slot 4$^A$ and is nearly to the extreme upper end of its movement.

By comparing these positions it will be seen that the pair of crank pins 21$^a$ and 21$^b$ are by counter-clockwise movement of the driving shaft 1 caused to move in a clockwise or reverse direction. This occurs by reason of the casing 3 being held against rotation; therefore, when it is desired to drive the shaft 2 in a reverse direction it is only necessary to hold the casing 3.

If the casing 3 were not held but were free to rotate, and if any appreciable resistance were offered to rotation by the shaft 2, the crank pins 21$^a$ and 21$^b$ would remain fixed in position and as the rotation of the single crank pin 11 revolves the disk 4, the slides 22$^a$ and 22$^b$ will move in their respective slots 4$^A$ and 4$^B$ but will react through the disks 4, 6 and 5, in order to rotate the casing 3 at half the speed of the driving shaft 1, but in a reverse direction. This action occurs then when it is desired to idle, and the casing 3 is not held at this time against rotation.

It will now be evident that in order to secure forward drive of the shaft 2 it is only necessary to clutch the two shafts directly together. As a means for accomplishing this I have shown cooperating clutch surfaces between the adjacent faces of the crank disk 10 and casing disk 5, and between the crank disk 20 and a clutch plate 7 adjacent thereto. The clutch plate 7, or means associated therewith, must be held non-rotative to the casing 3, but any suitable means of accomplishing this and of clutching together the two crank disks may be employed. I have shown a plurality of clutch pins 71 passing through an end of the casing and bearing against the clutch disk 7, these being normally held by means of springs 72 out of clutching position, but being operable through bell crank levers 73 to throw the clutch disk 7 into clutching engagement with the crank disk 20 and to force the mechanism interposed between this crank disk 20 and the opposite crank disk 10 axially of the casing 3 to a limited extent, to engage the crank disk 10 and the casing disk 5. It is for this purpose that the casing disk 5 is made axially slidable within the casing 3. The clutch plate 7 might be omitted, and the pins 71 made to bear directly against the crank disk 20, but is preferably employed to distribute the clutching effect more evenly.

Any suitable means may be employed for controlling the clutch. Preferably the forward, reverse, and idling positions are controlled by a single control lever 8. By means of a sleeve 74 slidable lengthwise of the sleeve 31 and having an inclined surface 75 engageable with rollers 76 upon the bell crank levers 73, these levers 73 can be moved simultaneously into clutching position to secure forward movement of the driven shaft 2. With the rollers 76 in the position shown in Figure 1, however, they ride upon a surface 77 of reduced diameter and the clutch disk 7 is thereby withdrawn from clutching position. At such times the casing 3 may be held against rotation to produce reverse rotation of the shaft 2 or the device may be permitted to idle.

For holding the casing 3 against rotation I have shown a pair of shoes 9, engageable with the periphery of the casing 3 and controllable through levers 91 fulcrumed at 90, connected between their ends at 92 to the shoes 9 and having their opposite end connected by a rod 93. At one end the rod 93 is secured as shown at 94 to one of the pair of levers 91, which in Figure 3 are shown as doubled at each side, and at its other end a pin 98 is engaged by a link 88 having an inclined surface 89 by means of which the effective length of the rod 93 between the levers 92 may be shortened to draw them together and to cause the shoes 9 to grip the casing 3.

Application of the shoes 9 is controlled through the control lever 8 to which the link 88 is pivoted between its ends, and movement of the sleeve 74 is controlled by a lever 87 likewise controlled by the control arm 8. It will be understood that the control mechanism recited is not claimed as part of my invention, but that any suitable control means may be employed, though preferably one which necessitates but a single control lever, either for applying the shoes 9 or for moving the sleeve 74 is preferred.

As the operation of the device has been described in detail as the description progressed, further detailed description thereof is deemed unnecessary.

It should be noted that the various disks 6, 4, 20, 10, and 7 are not fitted within the casing 3, nor is the disk 5 of necessity closely fitted therein. The grooves and tongues 56, 65, 46, and 64 are readily cut in the disks, all grooves in each set being cut simultaneously by automatic machinery. By thus eliminating largely the necessity for careful and arcuate fitting, costly machine work is reduced to a minimum, yet the efficiency of the device is not thereby reduced.

What I claim as my invention is:

1. In combination with a driving and a driven shaft, a crank pin upon and revoluble about said driving shaft, a pair of diametrically opposed crank pins upon and revoluble about said driven shaft, a member engageable by said first crank pin for bodily movement about the axis of the driving shaft, means operable to maintain said member against rotation about its own axis, and said member being engageable with said pair of crank pins to give them, in revolving about the driving shaft axis, rotary movement in a reverse direction.

2. In combination with a driving and a driven shaft, a crank pin upon and revoluble about said driving shaft, a pair of diametrically opposite crank pins upon said driven shaft, a casing enclosing said crank pins, a member engageable by said first crank pin to be moved bodily thereby about the axis of the driving shaft, means for preventing rotation of said member relative to said casing, said member being engageable with said pair of crank pins to give them, when itself held against rotation, a rotary movement in a direction opposite that of the driving shaft, and means selectively operable to hold said casing against rotation to rotate the driving shaft in a reverse direction, to hold the casing and all said crank pins together to rotate the driving shaft in a forward direction, or to release said casing and said crank pins to permit the driving shaft to idle.

3. In combination with a driving and a driven shaft, reversible clutch mechanism connecting said shafts and comprising a crank upon the driving shaft, a pair of diametrically opposite crank pins upon the driven shaft, a disk having two crossed grooves in one face, each of said pair of crank pins being received in its respective groove, and said disk being engaged by said crank upon the driving shaft to be bodily revolved thereabout, means operable to prevent rotation of said disk about its own axis, and means for selectively clutching said driving and driven shafts together for rotation in the same direction, for permitting rotation of said disk to disconnect said shafts, or for preventing rotation of said disk to connect the shafts for reverse operation.

4. In combination with alined driving and driven shafts, clutch mechanism therefor comprising a casing surrounding the adjacent ends of said shafts and journaled thereon, a crank pin secured upon and revoluble about the axis of said driving shaft, a pair of diametrically opposite crank pins secured upon and revoluble about the axis of said driven shaft, a disk engageable by said first crank pin for bodily revolution about the axis of said shafts, and within said casing, means for holding said disk against rotation relative to the casing, and two crossed grooves in one face of said disk each engaged by its respective one of said pair of crank pins, and means for operatively connecting said shafts through said clutch mechanism for selectively turning them in forward and reverse directions.

5. In combination with alined driving and driven shafts, clutch mechanism therefor comprising a casing surrounding the adjacent ends of said shafts and journaled thereon, a crank pin secured upon and revoluble about the axis of said driving shaft, a pair of diametrically opposite crank pins secured upon and revoluble about the axis of said driven shaft, a disk engageable by said first crank pin for bodily revolution about the axis of said shafts, and within said casing, means for holding said disk against rotation relative to the casing, and two crossed grooves in one face of said disk each engaged by its respective one of said pair of crank pins, and a clutch disk supported from the casing and operable to secure said first disk, the crank pins, and the casing to rotate together.

6. In combination with alined driving and driven shafts, clutch mechanism therefor comprising a casing surounding the adjacent ends of said shafts and journaled thereon, a crank pin secured upon and revoluble about the axis of said driving shaft, a pair of diametrically opposite crank pins secured upon and revoluble about the axis of said driven shaft, a disk engageable by said first crank pin for bodily revolution about the axis of said shafts, and within said casing, means for holding said disk against rotation relative to the casing, and two crossed grooves in one face of said disk each engaged by its respective one of said pair of crank pins, and means for securing said casing against rotation to cause reverse rotation of the driven shaft.

7. In combination with alined driving and driven shafts, clutch mechanism therefor comprising a casing surrounding the adjacent ends of said shafts and journaled thereon, a crank pin secured upon and revoluble about the axis of said driving shaft, a pair of diametrically opposite crank pins secured upon and revoluble about the axis of said driven shaft, a disk engageable by said first crank pin for bodily revolution about the axis of said shafts, and within said casing, means for holding said disk against rotation relative to the casing, and two crossed grooves in one face of said disk each engaged by its respective one of said pair of crank pins, a clutch disk supported from the casing and operable to secure said first disk, the crank pins, and the casing to rotate together, means for securing said casing against rotation to cause reverse rotation of the driven shaft, and means operable to selectively actuate said clutch disk or said casing-securing means, or to release both.

8. In combination with alined driving and driven shafts, clutch mechanism therefor comprising a casing surrounding the adjacent ends of said shafts and journaled thereon, a crank pin secured upon and revoluble about the axis of said driving shaft, a pair of diametrically opposite crank pins secured upon and revoluble about the axis of said driven shaft, a disk engageable by said first crank pin for bodily revolution about the axis of said shafts, and within said casing, parallel grooves in the face of said disk nearest the single crank, a casing disk within and non-rotative relative to the casing, said first crank passing therethrough, said casing disk having a series of parallel grooves extending at an angle to and facing towards the grooves in said first disk, and a guide disk interposed between said first disk and said crank disk, and having grooves on its faces extending at like angles to the grooves on the adjacent disks and engaging therewith to prevent rotation of the first disk relative to the casing, and means upon said first disk engageable by said pair of crank pins to effect operative engagement therebetween.

9. In combination with alined driving and driven shafts, clutch mechanism therefor comprising a casing surrounding the adjacent ends of said shafts and journaled thereon, a crank pin secured upon and revoluble about the axis of said driving shaft, a pair of diametrically opposite crank pins secured upon and revoluble about the axis of the driven shaft, a disk engageable by said first crank pin for bodily revolution about the axis of said shafts, and within said casing, a casing disk non-rotative relative to said casing, the first crank pin extending therethrough, a floating disk interposed between said crank disk and said first disk, both faces of said floating disk having parallel grooves therein, the direction of the grooves in one face extending at right angles to the direction of the grooves in its other face, and said casing disk and first disk having grooves corresponding to and engaged with the grooves on the adjacent face of said floating disk, and means operatively connecting said first disk and said pair of crank pins.

10. In combination with alined driving and driven shafts, reversible clutch mechanism for connecting the adjacent ends of said shafts comprising a casing journaled on said shafts, a single crank pin secured to and revoluble about the driving shaft, a pair of diametrically opposed crank pins secured to and revoluble about the driven shaft, a plurality of disks within said casing, including a casing disk having limited movement lengthwise of the casing but held against rotation relative thereto, a disk engageable by said single crank pin and having operative connection to rotate or be rotated by said pair of crank pins, and a floating disk interposed between said two disks, and having guide means upon its opposite faces engaging the adjacent faces of said two disks to prevent rotation of said second disk relative to the casing but permitting its bodily revolution therein about the axis of said shafts, and means for selectively holding said casing against rotation, for holding said disks and cranks against relative movement, or for releasing both the cranks and the casing to permit the disks to idle.

11. In a driving gear the combination of a driving-member, a coaxial driven member, an intermediate cross slotted element supported by one of these members to turn about an axis eccentric thereto, crank pins upon the other member in engagement with the slots of the cross slotted element, a controlling-device for the cross slotted element engaged therewith by means permitting relative lateral displacement without relative angular movement between these two parts, means to hold the controlling device from rotation when desired and thus to rotate the driven-member in the opposite direction from the driving member, and locking means between two of the said parts to prevent relative movement when desired and thus to cause the gear to rotate forwardly as one whole.

12. In a driving gear the combination of a driving member, a coaxial driven member, an intermediate cross-slotted element supported by one of these members to turn about an axis eccentric thereto, crank pins upon the other member in engagement with the slots of the cross-slotted element, a controlling device for the cross-slotted element engaged therewith by means permitting relative lateral displacement without relative angular movement between these two parts, a brake to hold the controlling device from rotation when desired and thus to rotate the driven-member in the opposite direction from the driving member, and locking means between two of the said parts to prevent relative movement when desired and thus to cause the gear to rotate forwardly as one whole.

13. In a driving gear the combination of a driving member, a coaxial driven-member, an intermediate cross-slotted element supported by one of these members to turn about an axis eccentric thereto, crank pins upon the other member in engagement with the slots of the cross-slotted element, a clutch-part engaged with the cross-slotted element by means permitting relative lateral displacement without relative angular movement between these two parts, means to hold the clutch-part from rotation when desired and thus to rotate the driven-member in the opposite direction from the driving member, a cooperating clutch-part rotatable with the driving-member and means to engage the two clutch parts operatively together when desired and thus to cause the gear to rotate forwardly as one whole.

14. In a driving gear the combination of a driving member, a coaxial driven-member, an intermediate cross-slotted element supported by one of these members to turn about an axis eccentric thereto, crank pins upon the other member in engagement with the slots of the cross-slotted element, a clutch-part engaged with the cross-slotted element by means permitting relative lateral displacement without relative angular movement between these two parts, a brake to hold the clutch-part from rotation when desired and thus to rotate the driven-member in the opposite direction from the driving-member, a co-operating clutch-part rotatable with the driving member and means to engage the two clutch-parts operatively together when desired, and thus to cause the gear to rotate forwardly as one whole.

15. In a driving gear the combination of a driving member, a coaxial driven member, an intermediate cross-slotted element supported by one of these members to turn about an axis eccentric thereto, crank pins upon the other member in engagement with the slots of the cross-slotted element, a clutch-part engaged with the cross-slotted element by means permitting relative lateral displacement without relative angular movement between these two parts, a brake to hold the clutch-part from rotation when desired and thus to rotate the driven-member in the opposite direction from the driving-member, a co-operating clutch-part rotatable with the driving-member and means to engage the two clutch-parts operatively together when desired, and thus to cause the gear to rotate forwardly as one whole, an actuating member for the clutch and operative connections from the same actuating-member to the brake, so arranged that when the clutch is engaged the brake is released and vice versa.

Signed at Raymond, Pacific County, Washington, this day of 9th Oct., 1924.

ENSLEY J. DONCASTER.